UNITED STATES PATENT OFFICE.

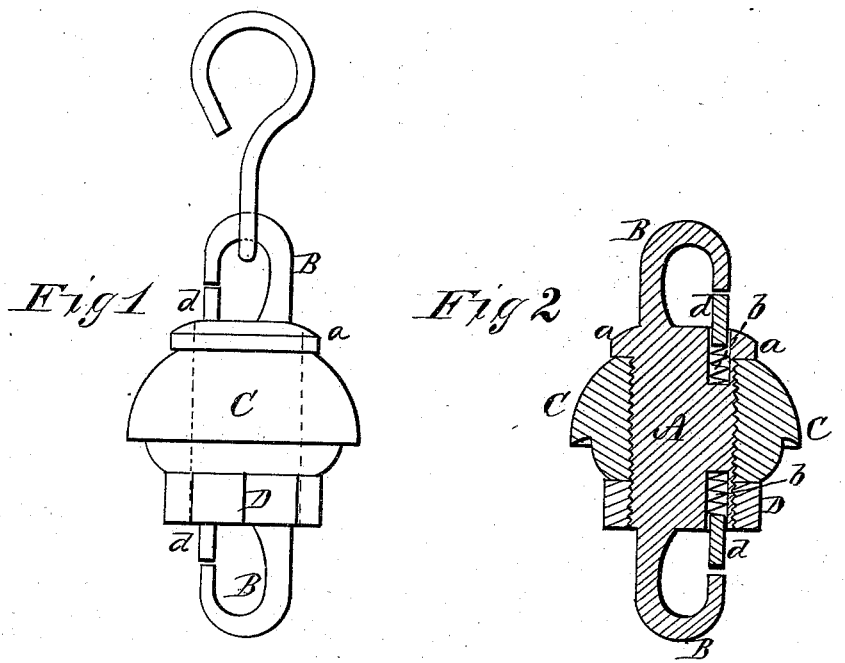

WILLIAM B. WILCOX, OF YPSILANTI, MICHIGAN.

IMPROVEMENT IN CHAIN-PUMP BUCKETS.

Specification forming part of Letters Patent No. 174,045, dated February 22, 1876; application filed January 21, 1876.

*To all whom it may concern:*

Be it known that I, WM. B. WILCOX, of Ypsilanti, in the county of Washtenaw and State of Michigan, have invented certain new and useful Improvements in Chain-Pump Buckets; and I do hereby declare that the following is a full, clear, and exact description thereof, reference being had to the accompanying drawings, and to the letters of reference marked thereon, which form part of this specification.

My invention relates to buckets for chain-pumps; and it consists in providing the same with a solid link and snap-spring, to obviate the necessity of opening the links of the chain and the liability of breakage, as will be hereinafter more fully set forth.

In order to enable others skilled in the art to which my invention appertains to make and use the same, I will now proceed to describe its construction and operation, referring to the annexed drawing, in which—

Figure 1 is a side view of a chain-pump bucket embodying my invention. Fig. 2 is a longitudinal section of the same.

A represents a solid cylindrical body of suitable dimensions, formed at each end with a hook or open link, B, as shown. At one end of the body A is a circumferential flange, $a$, against which the rubber C is held by means of the nut D, screwed upon the lower end of the body A.

The rubber C may be made in any of the known and usual ways for chain-pump buckets, and is distended, as required, by screwing up the nut D.

In each end of the body A is made a suitable hole for the reception of a spiral spring, $b$, and a pin or bolt, $d$, therein, which latter is pressed outward by the spring against the end of the hook or open link B, thus forming, as it were, a snap-hook, which can be easily opened as required, for inserting and removing the links of the chain. By this means I obviate the necessity of opening the links of the chain, and lessen the liability of breakage.

Having thus fully described my invention, what I claim as new, and desire to secure by Letters Patent, is—

The combination, in a chain-pump bucket, of the solid body A, with hooks or open links B at its ends, the springs $b$, and bolts $d$, all substantially as and for the purposes herein set forth.

In testimony that I claim the foregoing as my own I affix my signature in presence of two witnesses.

WILLIAM B. WILCOX.

Witnesses:
J. WILLARD BABBITT,
FRANCIS P. BOGARDUS.